(12) United States Patent
Chen et al.

(10) Patent No.: US 11,508,093 B2
(45) Date of Patent: Nov. 22, 2022

(54) SCREEN CODING METHODS AND SYSTEMS BASED ON MASS CENTER COINCIDENCE

(71) Applicant: Guangzhou Baoshen Science & Applied Technologies Co., Ltd., Jianggao Town (CN)

(72) Inventors: Chengkai Chen, Jianggao Town (CN); Qingwei Chen, Jianggao Town (CN); Weizhong Huang, Jianggao Town (CN)

(73) Assignee: Guangzhou Baoshen Science & Applied Technologies Co., Ltd., Guangzhou (CN)

( * ) Notice: Subject to any disclaimer, the term of this patent is extended or adjusted under 35 U.S.C. 154(b) by 0 days.

(21) Appl. No.: 17/392,694

(22) Filed: Aug. 3, 2021

(65) Prior Publication Data
US 2022/0036594 A1   Feb. 3, 2022

(30) Foreign Application Priority Data
Aug. 3, 2020 (CN) .......................... 202010766564.1

(51) Int. Cl.
*G06T 7/60* (2017.01)
*G06T 9/00* (2006.01)
*G06V 20/80* (2022.01)

(52) U.S. Cl.
CPC .................. *G06T 9/00* (2013.01); *G06T 7/60* (2013.01); *G06V 20/80* (2022.01)

(58) Field of Classification Search
CPC ............... G06T 7/60; G06T 9/00; G06V 20/80
See application file for complete search history.

(56) References Cited

U.S. PATENT DOCUMENTS

| 2007/0189579 A1* | 8/2007 | Crookham | G06V 10/462 |
| | | | 382/100 |
| 2008/0123965 A1* | 5/2008 | Yang | G06F 3/03545 |
| | | | 382/203 |
| 2018/0041768 A1* | 2/2018 | Koo | H04N 19/70 |

FOREIGN PATENT DOCUMENTS

| CN | 1754380 A | 3/2006 |
| CN | 1882026 A | 12/2006 |

(Continued)

OTHER PUBLICATIONS

Daniel et al. ("Chain Coding with a Hexagonal Lattice," IEEE Transactions on Pattern Analysis and Machine Intelligence. vol. PAMI-5, Issue: 5, Sep. 1983) (Year: 1983).*

(Continued)

*Primary Examiner* — Yubin Hung
(74) *Attorney, Agent, or Firm* — Dinsmore & Shohl LLP

(57) ABSTRACT

A screen coding method and system based on mass center coincidence. The screen coding method based on mass center coincidence includes: constructing a plurality of coding unit models composed of a combination of a plurality of geometric figures with coincident mass centers, where vertices of the geometric figures do not coincide; and filling in data information to each vertex of the coding unit models according to a method of data information arrangement of a plurality of data combinations to generate a coding unit so as to implement different data lengths of the same coding unit. As such, a data length of the coding unit can be controlled, so that when more data needs to be coded, the overall size of the coding unit does not need to be changed, which greatly improves coding efficiency.

8 Claims, 11 Drawing Sheets

(56) References Cited

FOREIGN PATENT DOCUMENTS

| | | | |
|---|---|---|---|
| CN | 101038676 A | 9/2007 |
| CN | 101097504 A | 1/2008 |
| CN | 101193188 A | 6/2008 |
| CN | 103700060 A | 4/2014 |
| CN | 104154904 A | 11/2014 |
| CN | 106105199 A | 11/2016 |
| CN | 108701242 A | 10/2018 |
| CN | 110084080 A | 8/2019 |
| CN | 110378939 A | 10/2019 |
| EP | 3313079 A1 | 4/2018 |

OTHER PUBLICATIONS

Rannou et al. ("Equilateral polygon approximation of closed contours," Pattern Recognition; vol. 29, Issue 7, Jul. 1996) (Year: 1996).*
Tan et al. ("A Novel Approach to 2-D Shape Representation Based on Equilateral Polygonal Approximation," International Conference on Computer Science and Software Engineering; Date of Conference: Dec. 12-14, 2008) (Year: 2008).*
Wang, Juan, Research on Information Hiding System Based on Screen Coding, China Excellent Masters Thesis Full-text Database Information Technology Series, 2018 (No. 05).
Xu, Jun, Research on Information Hiding Method Based on Screen Coding, China Excellent Masters Thesis Full-text Database Information Technology Series, 2013 (No. 06).
Sun et al., Recognition of the Screen Coding Based on Mathematical Morphology, 2012 5th International Congress on Image and Signal Processing, 2012.

\* cited by examiner

Shute

Senior software engineer

E-mail: lt021@gzbaoshen.com
Tel: +86 137 6076 2765
Website: www.gzbsn.com
www.gzbaoshen.com

Fig. 14

Shute

Senior software engineer

E-mail: lt021@gzbaoshen.com
Tel: +86 137 6076 2765
Website: www.gzbsn.com
www.gzbaoshen.com

Fig. 15

SCREEN CODING METHODS AND SYSTEMS BASED ON MASS CENTER COINCIDENCE

CROSS-REFERENCE TO RELATED APPLICATION

The present application claims the priority benefit of Chinese Patent Application No. CN202010766564.1, entitled SCREEN CODING METHOD AND SYSTEM BASED ON CENTROID COINCIDENCE and filed on Aug. 3, 2020, the entire contents of which are hereby incorporated in its entirety.

TECHNICAL FIELD

The present disclosure relates to the technical field of computer coding, and in particular, to systems and methods for improving coding efficiency.

BACKGROUND

In existing screen dot coding schemes on the market, coding units are often on a specific geometric figure. Several special positions in the geometric figure are selected, zero or more data points are coded into these special positions, and data of a certain length is formed according to changes in positions of different data points. Usually a plurality of coding units are used to form data of a sufficient length.

In the coding schemes implemented in this way, the length of the coded data is expanded usually by increasing the number of coding units. However, increasing the coding units will cause the overall size of the code to change and affect input digital information. If a user does not want the overall size of the code to change, a new coding scheme needs to be designed, which greatly affects the coding efficiency.

SUMMARY

The technical problem to be solved by the present disclosure is to provide a screen coding method and system based on mass center coincidence, which can control a data length of a coding unit, so that when more data needs to be coded, the overall size of the coding unit does not need to be changed, which greatly improves coding efficiency.

To solve the above technical problems, according to the first aspect of the present disclosure, a screen coding method based on mass center coincidence is disclosed. The method includes: constructing a plurality of coding unit models including a combination of a plurality of geometric figures with coincident mass centers, where vertices of the geometric figures do not coincide; and filling in data information to each vertex of the coding unit models according to a method of data information arrangement of a plurality of data combinations to generate a coding unit so as to implement different data lengths of the same coding unit.

In some implementations, during the constructing a plurality of coding unit models composed of a combination of a plurality of geometric figures with coincident mass centers, the coding unit models are each implemented as a combination of two equilateral polygons with coincident mass centers and the method of data information arrangement of a plurality of data combinations includes: using vertices of the two equilateral polygons as a first change element; using the number of coded data points as a second change element; and performing arrangement and combination according to the first change element and the second change element to determine a method of data information arrangement.

In some implementations, the method of data information arrangement of a plurality of data combinations further includes: using mass centers of the two equilateral polygons as a third change element; and performing arrangement and combination according to the first change element, the second change element, and the third change element to determine a method of data information arrangement.

In some implementations, the method further includes: configuring a positioning recognition unit different from the coding unit; configuring a boundary unit used to determine an image boundary; and correcting a digital image including the positioning recognition unit and the boundary unit through a perspective change.

In some implementations, the configuring the positioning recognition unit different from the coding unit model with coded data points includes: configuring a coding unit model of the positioning recognition unit to adopt a combination of geometric figures different from those of other coding units.

In some implementations, the configuring the positioning recognition unit different from the coding unit model with coded data points includes: configuring the number of coded data points of the positioning recognition unit to be different from the number of coded data points of the coding unit.

According to the second aspect of the present disclosure, a screen coding system based on mass center coincidence is provided. The system includes: a coding unit model generation module, configured to construct a plurality of coding unit models composed of a combination of a plurality of geometric figures with coincident mass centers, where vertices of the geometric figures do not coincide; and a coding unit generation module, configured to fill in data information to each vertex of the coding unit models according to a method of data information arrangement of a plurality of data combinations to generate a coding unit so as to implement different data lengths of the same coding unit.

In some implementations, in the coding unit model generation module, the coding unit models are each implemented as a combination of two equilateral polygons with coincident mass centers and the method of data information arrangement of a plurality of data combinations of the coding unit generation module is implemented as: using vertices of the two equilateral polygons as a first change element; using the number of coded data points as a second change element; and performing arrangement and combination according to the first change element and the second change element to determine a method of data information arrangement.

In some implementations, the method of data information arrangement of a plurality of data combinations of the coding unit generation module is implemented as: using mass centers of the two equilateral polygons as a third change element; and performing arrangement and combination according to the first change element, the second change element, and the third change element to determine a method of data information arrangement.

In some implementations, the screen coding system based on mass center coincidence further includes: an image correction module, configured to configure a positioning recognition unit different from the coding unit, configure a boundary unit used to determine an image boundary, and correct an image including the positioning recognition unit and the boundary unit through a perspective change.

Compared with the prior art, the present disclosure has the following beneficial effects:

In the present disclosure, through a coding scheme with a controllable data length of a coding unit, when more data needs to be coded, the overall size of the coding unit does not need to be changed, which greatly improves coding efficiency, and adapts to a data coding scheme of a plurality of different coding units. Moreover, the solution is based on coding unit models composed of a plurality of polygons with coincident mass centers, which is simple and easy to implement, and a plurality of different coding unit models that are conducive to data coding are provided, which is conducive to the application of a plurality of coding forms. In addition, an image using this coding method can also be used for image correction processing.

BRIEF DESCRIPTION OF THE DRAWINGS

FIG. 14 is another schematic diagram of the identity card using a screen coding method based on mass center coincidence in FIG. 13 according to an embodiment of the present disclosure;

FIG. 15 is still another schematic diagram of the identity card using a screen coding method based on mass center coincidence in FIG. 13 according to an embodiment of the present disclosure.

DESCRIPTION OF EMBODIMENTS

For better understanding and implementation, the following clearly and completely describes the technical solutions in the embodiments of the present disclosure in conjunction with accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

The terms "including" and "having" and any variations thereof according to embodiments of the present disclosure are intended to cover non-exclusive inclusions. For example, a process, method, system, product, or device that includes a series of steps or modules is not necessarily limited to those steps or modules clearly listed, and may include other steps or modules that are not clearly listed or are inherent to these processes, methods, products, or devices.

Embodiments of the present disclosure disclose a screen coding method and system based on mass center coincidence. Through a coding scheme with a controllable data length of a coding unit, when more data needs to be coded, the overall size of the coding unit does not need to be changed, which greatly improves coding efficiency, and adapts to a data coding scheme of a plurality of different coding units. Moreover, the solution is based on coding unit models composed of a plurality of polygons with coincident mass centers, which is simple and easy to implement, and a plurality of different coding unit models that are conducive to data coding are provided, which is conducive to the application of a plurality of coding forms. In addition, an image using this coding method can also be used for image correction processing.

Accordingly, it can be appreciated that the systems and methods disclosed herein improve the functionality of a computing device by implementing a coding scheme that controls the overall length of a particular coding unit. As such, when additional data is to be coded, the overall size of the coding unit can be minimized or avoided, which greatly improves coding efficiency.

Embodiment 1

Figure 1:
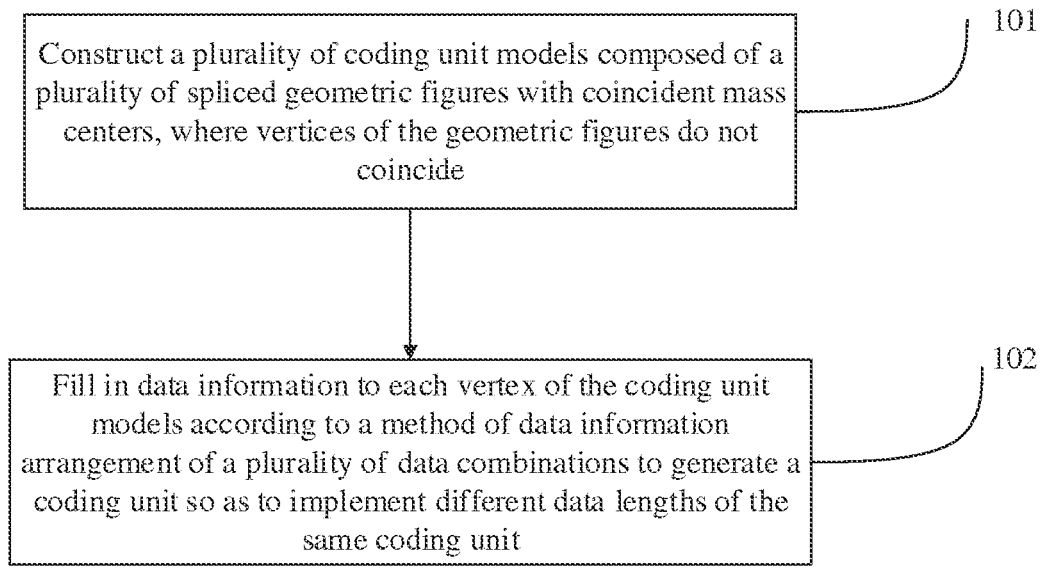
FIG. 1 is a schematic flow chart of a screen coding method based on mass center coincidence according to an embodiment of the present disclosure.

Referring to FIG. 1, a schematic flow chart of a screen coding method based on mass center coincidence according to an embodiment of the present disclosure is depicted. The screen coding method based on mass center coincidence can be applied to an image coding system, and no restriction is imposed on a specific application system embodiment of the present disclosure. As shown in FIG. 1, the screen coding method based on mass center coincidence may include the following operations.

At block 101, a plurality of coding unit models composed of a combination of a plurality of geometric figures with coincident mass centers are constructed, where vertices of the geometric figures do not coincide.

On the premise of keeping the overall size unchanged, to make the coding unit change the data length that is filled in, the inventor conceived of using a specific spatial position of the geometric figure to code zero to more data points, and to form different digital information according to changes in the positions of the data points.

Figure 2:
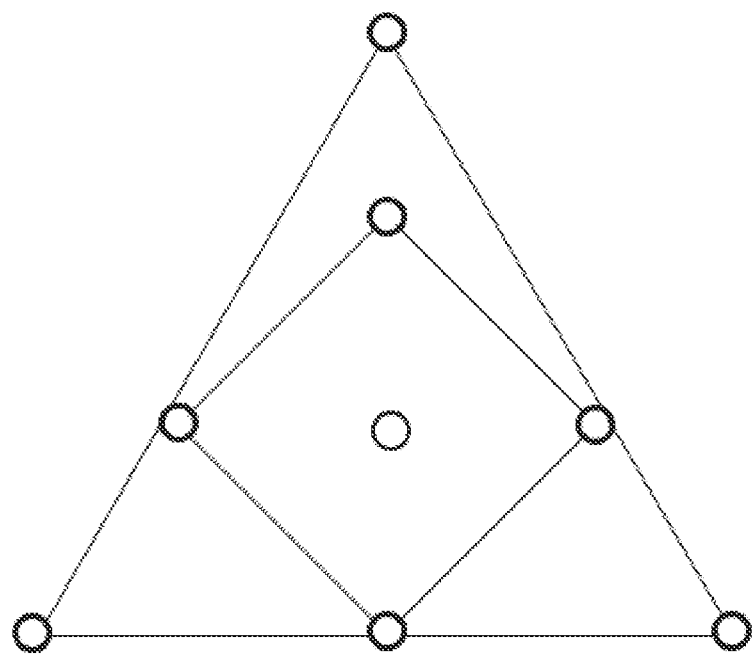
FIG. 2 is a schematic structural diagram of a coding unit in a screen coding method based on mass center coincidence according to an embodiment of the present disclosure.
Figure 3:
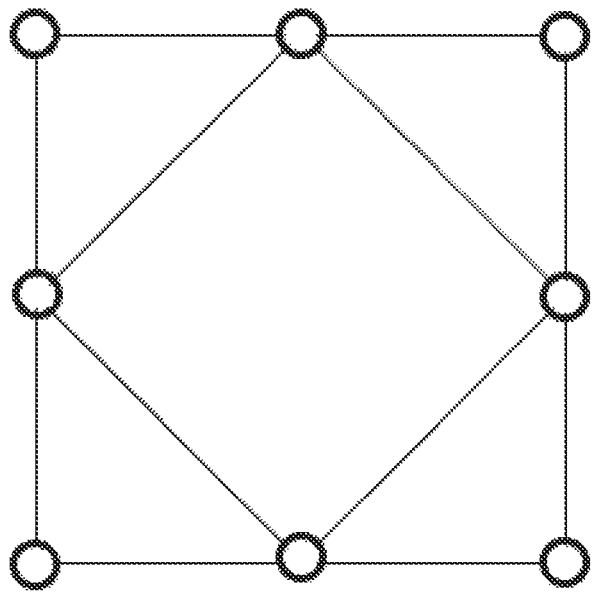
FIG. 3 is a schematic structural diagram of a coding unit in another screen coding method based on mass center coincidence according to an embodiment of the present disclosure.
Figure 4:
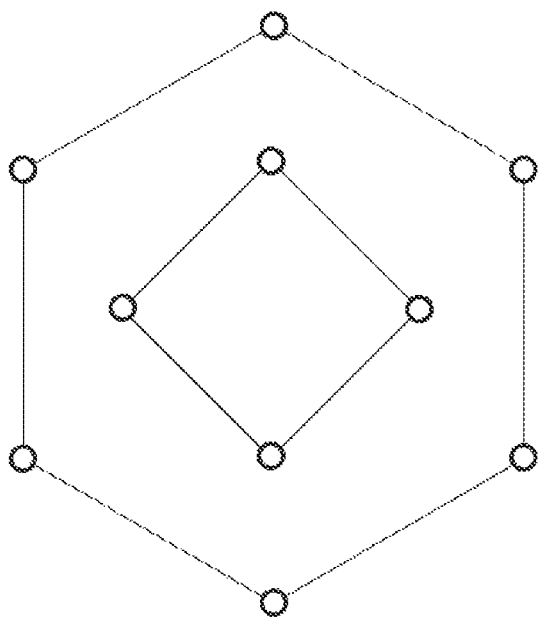
FIG. 4 is a schematic structural diagram of a coding unit in another screen coding method based on mass center coincidence according to an embodiment of the present disclosure.

The coding unit model is implemented as using N vertices of an equilateral polygon with N sides to form digital information. In this embodiment, the coding unit model is specifically implemented as a combination of two equilateral polygons with coincident mass centers, which can be implemented as a construction method in which mass centers of two geometric figures, namely a square and an equilateral triangle outside the square, coincide while vertices thereof do not coincide as shown in FIG. 2. The coding unit model may also be implemented as a construction method in which mass centers of a small square and a large square coincide while vertices thereof do not coincide as shown in FIG. 3. The coding unit model may also be implemented as a construction method in which mass centers of a regular hexagon and a square provided therein coincide while vertices thereof do not coincide as shown in FIG. 4.

At block 102, data information is filled in to each vertex of the coding unit models according to a method of data information arrangement of a plurality of data combinations to generate a coding unit so as to implement different data lengths of the same coding unit.

Since the mass centers of the coding unit models coincide, in a coding unit, a plurality of geometric figures with coincident mass centers can be used as needed to form data of a sufficient length, so that the data capacity can be freely controlled. The specific implementation is as follows: the method of data information arrangement of a plurality of data combinations includes: using vertices of the two equilateral polygons as a first change element, using the number of coded data points as a second change element, and performing arrangement and combination according to the first change element and the second change element to determine a method of data information arrangement. Exemplarily, taking the combination of "the equilateral triangle" and "the square" shown in FIG. 2 as an example, 3 vertices of the equilateral triangle and 4 vertices of the square are used as the first change element, and the vertices of the equilateral triangle and the square do not coincide. When the required number of coded data points is 2, a user can choose to use one vertex in each of the triangle and the square to code the data points, and then there are 3×4=12 kinds of changes according to the arrangement and combination. When the required number of coded data points is 2 and any vertex of the triangle or square can be selected, then there are (7×6)/(1×2)=21 methods of data information arrangement according to the arrangement and combination.

Figure 5:
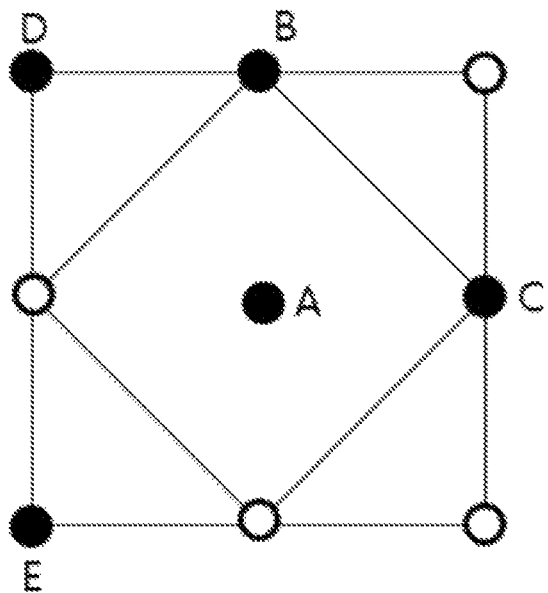
FIG. 5 is a schematic structural diagram of a coding unit in another screen coding method based on mass center coincidence according to an embodiment of the present disclosure.
Figure 6:
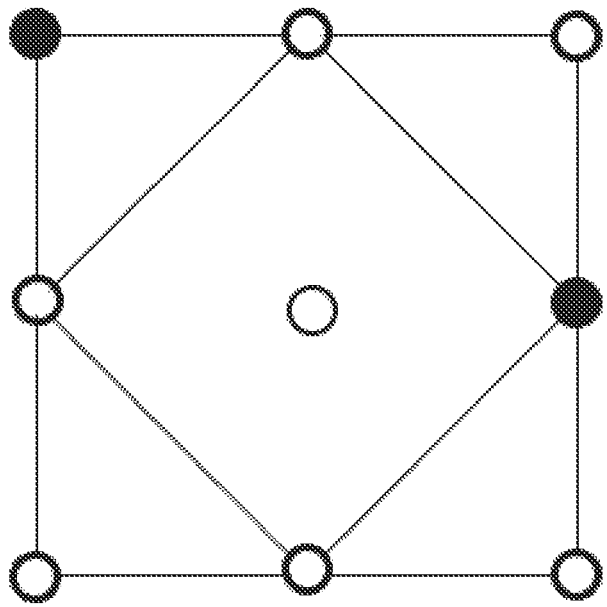
FIG. 6 is a schematic structural diagram of a coding unit in another screen coding method based on mass center coincidence according to an embodiment of the present disclosure.

In other implementations, mass centers of the two equilateral polygons may also be used as a third change element, and then arrangement and combination are performed according to the first change element, the second change element, and the third change element to determine a method of data information arrangement. Exemplarily, taking the combination of "the large square" and "the small square" shown in FIG. 5 as an example, 4 vertices of the large square and 4 vertices of the small square are used as the first change element, and the vertices of the large square and the small square do not coincide. In this case, the mass center is considered as the third change element. When the required number of coded data points is 2, the user can choose to use one vertex in each of the large square and the small square to code the data points as shown in FIG. 6, and then there are 9×8/(1×2)=36 kinds of changes according to the arrangement and combination. The specific example in which a mass center, 2 points of a small square and 2 points of a large square are used involves a total of 5 points. When positioning recognition is performed, the mass center point needs to be identified first, then the 2 points of the small square are identified, and the 2 points of the large square are located. As shown in FIG. 5, a distance between the mass center and the vertex of the small square may be denoted as r, and a distance from the mass center to the large square may be denoted as R (where R=2^0.5×r). Then, the figure is traversed and any point A is identified as the mass center of the positioning unit, provided that point A meets all the following conditions. The conditions are as follows:

(1) It is identified whether there are two points B and C in the circle with a radius greater than 0.9 r and less than 1.1 r from point A. For simplicity and ease of explanation, A is denoted as the pole of a polar coordinate system and AC as 0° of the polar coordinate system. The angle of AB in the polar coordinate system is between 75° and 105°.

(2) It is identified whether there are two points D and E in the circle with a radius greater than 0.9 R and less than 1.1 R from point A, the angle of AD in the polar coordinate system is between 120° and 150°, and the angle of AE in the polar coordinate system is between 210° and 240°.

When A meets the above conditions, A is the mass center of the positioning unit, B and C are 2 points on the small square, and D and E are 2 points on the large square. In addition, it should be noted that the conditions of A in this embodiment are set as required and other conditions that need to be met at any point also fall within the protection scope of the present application.

Figure 7:
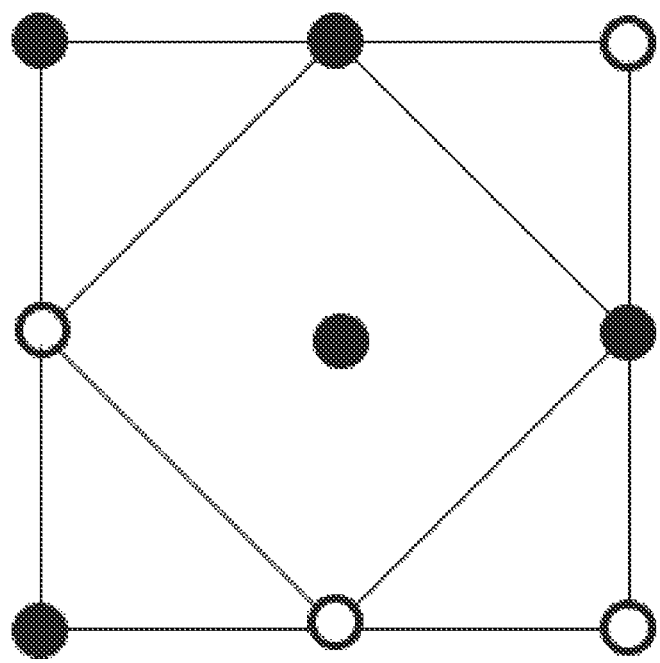
FIG. 7 is a schematic structural diagram of a coding unit in another screen coding method based on mass center coincidence according to an embodiment of the present disclosure.

In other implementations, image correction processing can also be performed according to an image formed by coding units constructed in this way. The method specifically includes: configuring a positioning recognition unit different from the coding unit, and the difference may be embodied in the use of a specific coding unit model combination of geometric graphics different from other coding units. For example, the positioning recognition unit uses a combination of the equilateral triangle and the square as shown in FIG. 2, while other coding units use a combination of the large square and the small square as shown in FIG. 3. In addition, in other implementations, the difference may also be embodied in that the number of coded data points of the positioning recognition unit is different from the number of coded data points of other coding units. For example, a combination of a large square, a small square and mass center points is used, as shown in FIG. 7, the positioning recognition unit uses 5 data points; and as shown in FIG. 6, other coding units use 2 data points. The number of data points of the positioning recognition unit used for positioning recognition is different from the number of coded data points of the coding unit. As shown in FIG. 7, in the solution of using a mass center, 2 points of a small square, and 2 points of a large square, a total of 5 points are provided. Then when positioning recognition is performed, the mass center point is found first, then the 2 points of the small square are located, and the 2 points of the large square are located.

Figure 8:
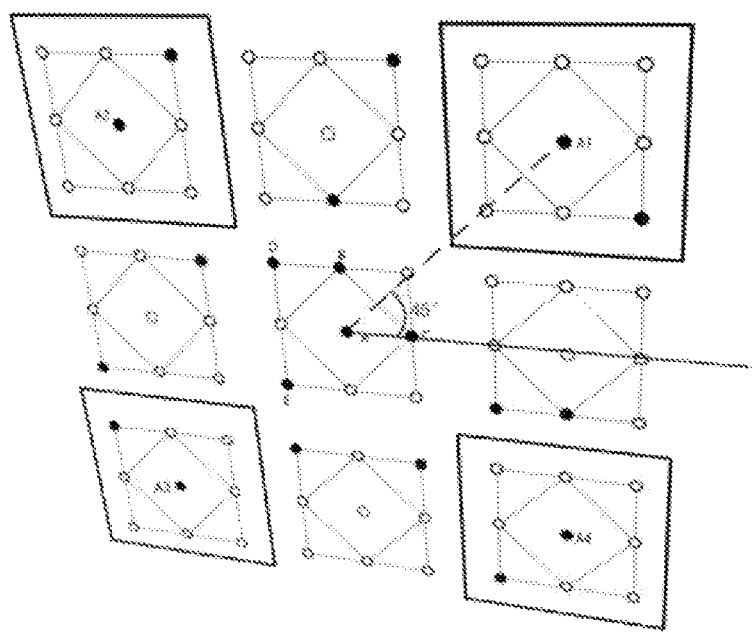
FIG. 8 is a schematic structural diagram of an image composed of screen coding units based on mass center coincidence according to an embodiment of the present disclosure.
Figure 9:
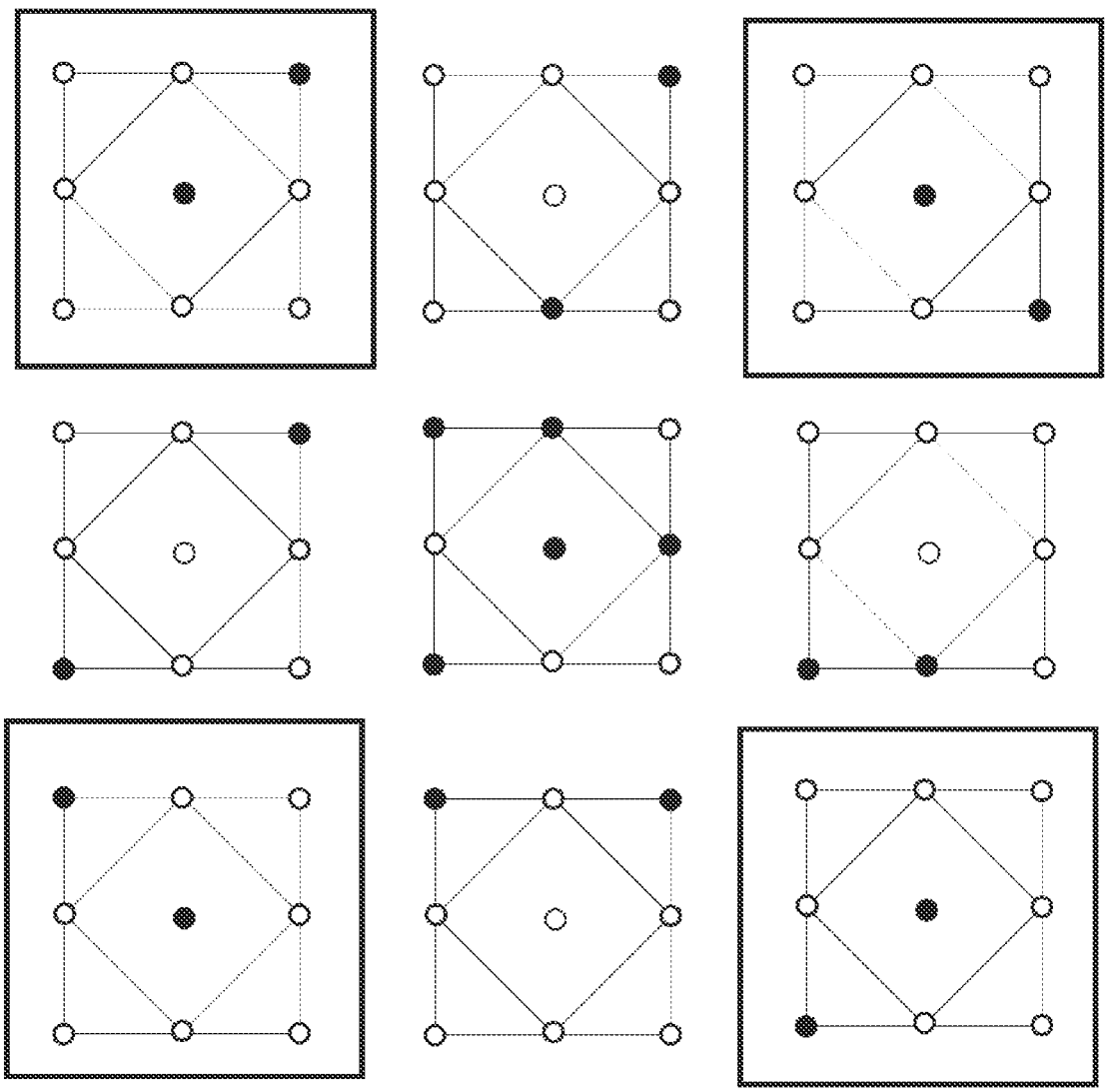
FIG. 9 is a schematic structural diagram of another image composed of screen coding units based on mass center coincidence according to an embodiment of the present disclosure.

When image correction is performed, it is also necessary to configure a boundary unit used to determine an image boundary. The boundary unit is composed of a mass center point and a non-mass center point. As shown in FIG. 9, the four coding units circled are boundary units. Exemplarily, when a camera is used to collect images, the collected images are usually deformed. FIG. 8 shows a specific effect photographed by a camera, and FIG. 9 shows a normal image effect. Herein, the image is corrected through perspective changes. According to the theory of perspective changes, 4 coded data points are needed. As shown in FIG. 8 and FIG. 9, in an image composed of 3×3=9 coding units, 4 coding units framed by thick lines are boundary units. The centers (mass center points) of the 4 boundary units are 4 points of the perspective changes, and the 4 points that affect the image need to be corrected. Specifically, in the 9 3×3 coding units shown in FIG. 8, a code element in the middle is the positioning unit (where FIG. 5 is an independent diagram of the positioning unit). A distance between the mass center and the vertex of the small square in the coding unit is denoted as r, a distance between the mass center and the large square is denoted as R, and a center distance between coding units next to each other is denoted as d. Then, when a figure is corrected, a positioning unit is identified first according to the method described in the previous positioning unit. For simplicity and ease of description, A is denoted as the pole of the polar coordinate system and AC is at 0° in the polar coordinate system. Assuming that point G1 is provided, the angle of AG1 in the polar coordinate system is 45°, and the length of AG1 is 2^0.5× (r+d)×k. All points are searched within the range with point G1 serving as the circle center and with a radius of r×k, and the point nearest to G1 is denoted as A1. A1 is a center point of a boundary unit in the upper right corner of the positioning unit (k is an estimated deformation coefficient. When point A1 is solved, A1 is close to point G1, and a ratio k of the length of AA1 to the length of AG1 is similar to a ratio of the length of AC to r, i.e., l≈|AC|/r.). In the same way, center points of boundary units in the upper left corner, lower left corner and lower right corner of the positioning unit can be obtained. In this case, center points of 4 positioning units are obtained, and the image can be corrected according to the principle of perspective transformation.

Figure 10:
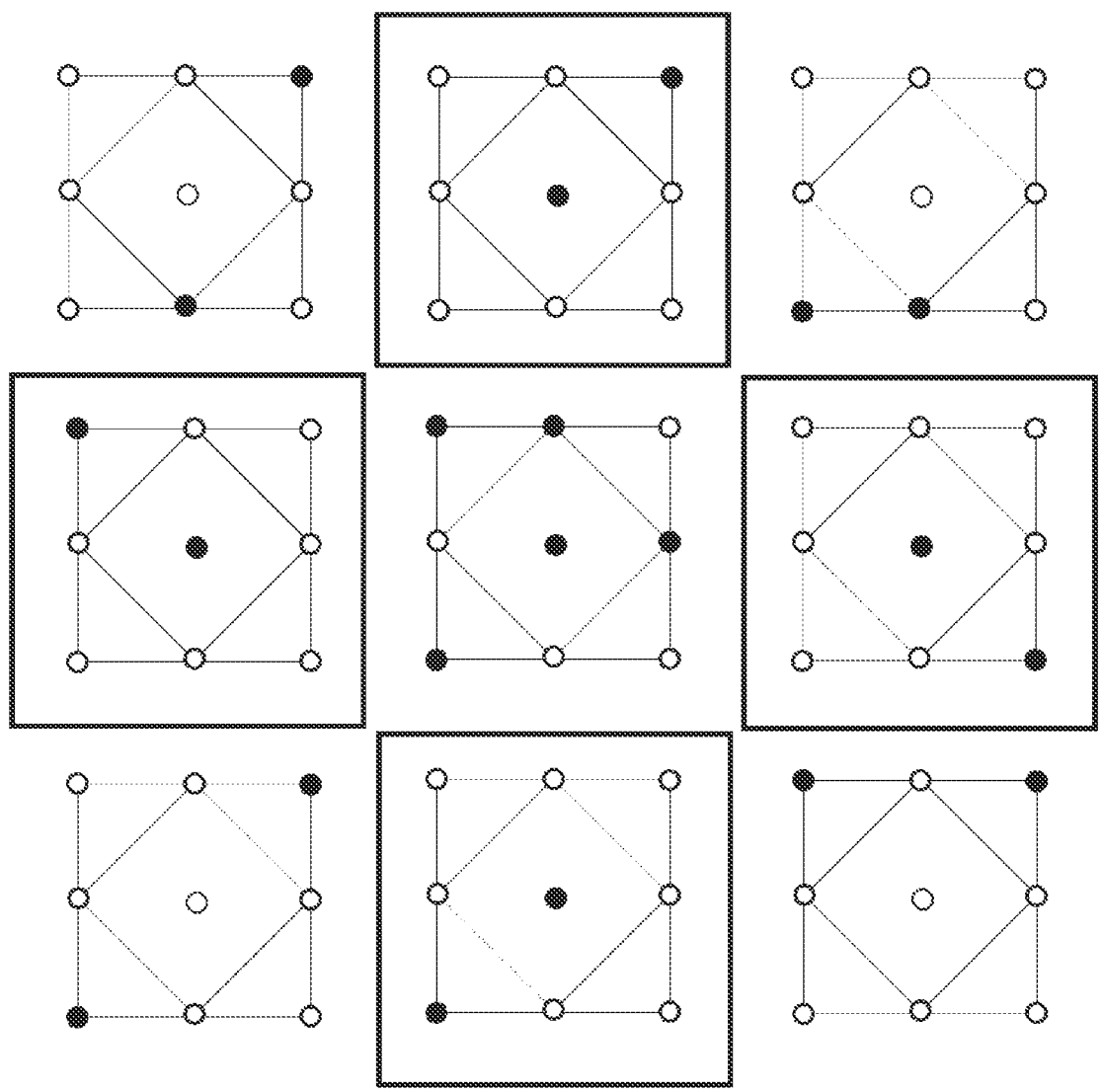
FIG. 10 is a schematic structural diagram of another image composed of screen coding units based on mass center coincidence according to an embodiment of the present disclosure.
Figure 11:
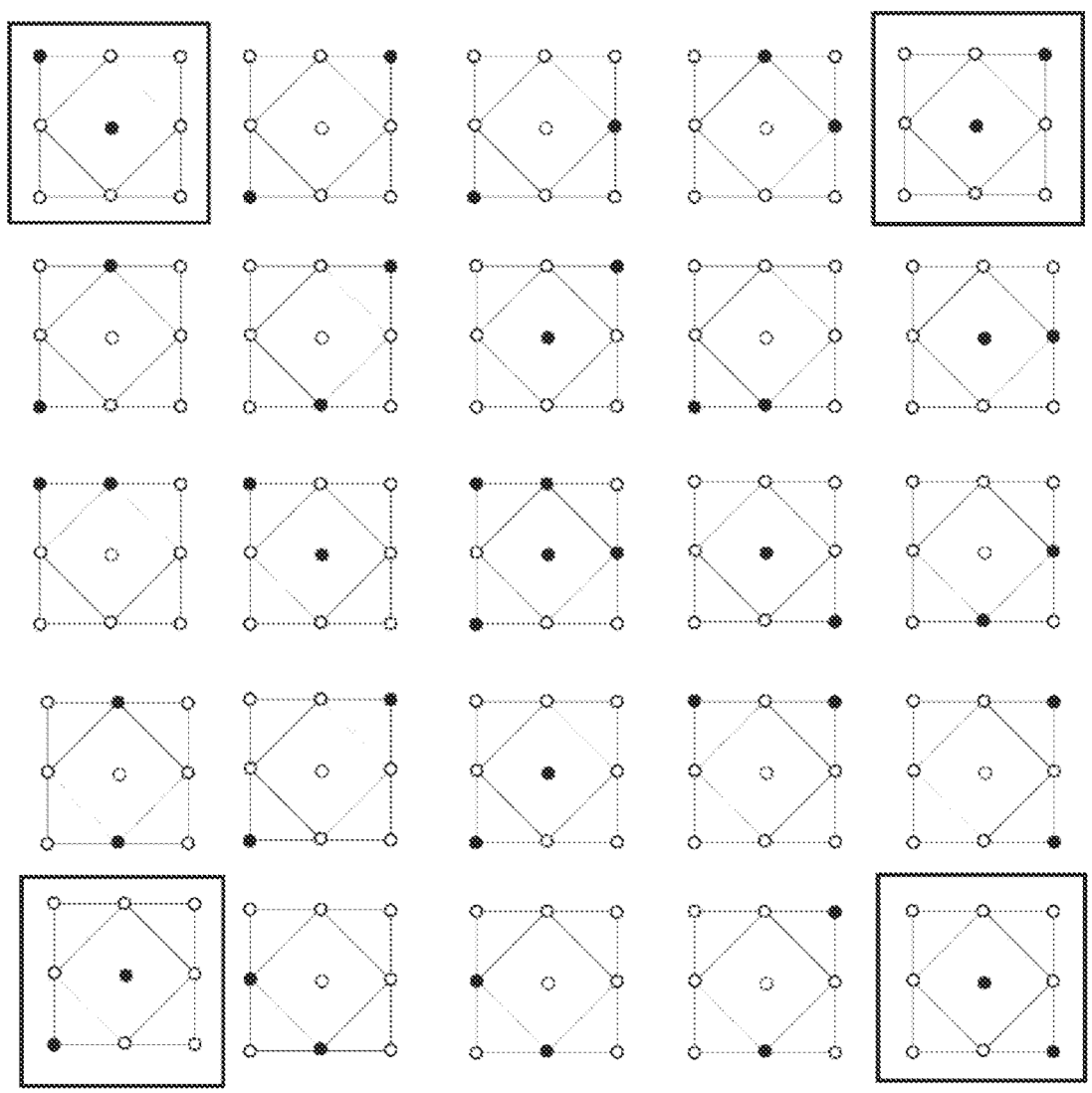
FIG. 11 is a schematic structural diagram of another image composed of screen coding units based on mass center coincidence according to an embodiment of the present disclosure.

Similarly, the 4 boundary units framed by the thick lines in FIG. 10 and FIG. 11 are points found to affect the normal display of the image when the above principle is used for image correction, and then the overall image is corrected by correcting such points.

In the method according to the embodiment of the present disclosure, through a coding scheme with a controllable data length of a coding unit, when more data needs to be coded, the overall size of the coding unit does not need to be changed, which greatly improves coding efficiency, and adapts to a data coding scheme of a plurality of different coding units. Moreover, the solution is based on coding unit models composed of a plurality of polygons with coincident mass centers, which is simple and easy to implement, and a plurality of different coding unit models that are conducive to data coding are provided, which is conducive to the application of a plurality of coding forms. In addition, an image using this coding method can also be used for image correction processing.

Embodiment 2

Figure 12:
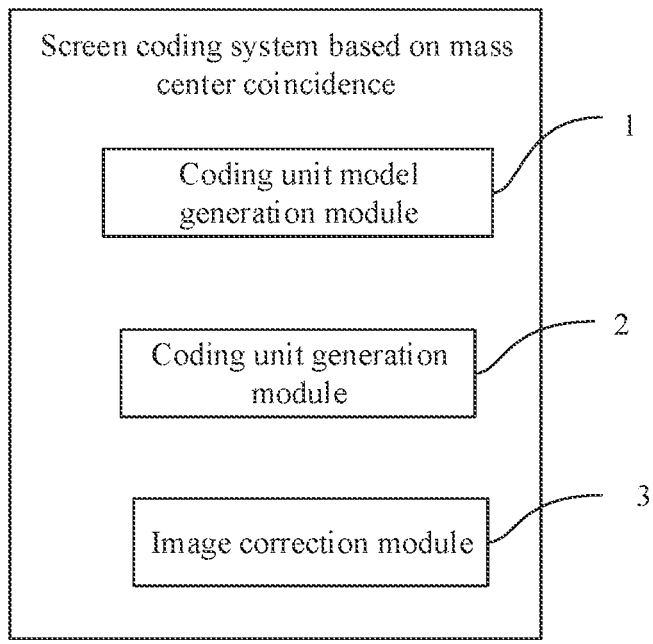
FIG. 12 is a block diagram of a screen coding system based on mass center coincidence according to an embodiment of the present disclosure.

Referring now to FIG. 12, a block diagram of a screen coding system based on mass center coincidence according to an embodiment of the present disclosure is depicted. The screen coding system based on mass center coincidence can be implemented as an image coding system, and no restriction is imposed on a specific application system embodiment of the present disclosure. As shown in FIG. 12, the screen coding system based on mass center coincidence includes a coding unit model generation module 1, configured to construct a plurality of coding unit models composed of a combination of a plurality of geometric figures with coincident mass centers, where vertices of the geometric figures do not coincide.

The coding unit model is implemented as using N vertices of an equilateral polygon with N sides to form digital information. In this embodiment, the coding unit model is specifically implemented as a combination of two equilateral polygons with coincident mass centers, which can be implemented as a construction method in which mass centers of two geometric figures, namely a square and an equilateral triangle outside the square, coincide while vertices thereof do not coincide as shown in FIG. 2. The coding unit model may also be implemented as a construction method in which mass centers of a small square and a large square coincide while vertices thereof do not coincide as shown in FIG. 3. The coding unit model may also be implemented as a construction method in which mass centers of a regular hexagon and a square provided therein coincide while vertices thereof do not coincide as shown in FIG. 4.

A coding unit generation module 2 is configured to fill in data information to each vertex of the coding unit models according to a method of data information arrangement of a plurality of data combinations to generate a coding unit so as to implement different data lengths of the same coding unit.

In the coding unit model generation module, the coding unit models are each implemented as a combination of two equilateral polygons with coincident mass centers and the method of data information arrangement of a plurality of data combinations of the coding unit generation module is implemented as: using vertices of the two equilateral polygons as a first change element; using the number of coded data points as a second change element; and performing arrangement and combination according to the first change element and the second change element to determine a method of data information arrangement. The method of data information arrangement of a plurality of data combinations of the coding unit generation module is implemented as: using mass centers of the two equilateral polygons as a third change element; and performing arrangement and combination according to the first change element, the second change element, and the third change element to determine a method of data information arrangement.

Since the mass centers of the coding unit models coincide, in a coding unit, a plurality of geometric figures with coincident mass centers can be used as needed to form data of a sufficient length, so that the data capacity can be freely controlled. The specific implementation is as follows: the method of data information arrangement of a plurality of data combinations includes: using vertices of the two equilateral polygons as a first change element, using the number of coded data points as a second change element, and performing arrangement and combination according to the first change element and the second change element to determine a method of data information arrangement. Exemplarily, taking the combination of "the equilateral triangle" and "the square" shown in FIG. 2 as an example, 3 vertices of the equilateral triangle and 4 vertices of the square are used as the first change element, and the vertices of the equilateral triangle and the square do not coincide. When the required number of coded data points is 2, a user can choose to use one vertex in each of the triangle and the square to code the data points, and then there are 3×4=12 kinds of changes according to the arrangement and combination. When the required number of coded data points is 2 and any vertex of the triangle or square can be selected, then there are (7×6)/(1×2)=21 methods of data information arrangement according to the arrangement and combination.

In other implementations, mass centers of the two equilateral polygons may also be used as a third change element, and then arrangement and combination are performed according to the first change element, the second change element, and the third change element to determine a method of data information arrangement. Exemplarily, taking the combination of "the large square" and "the small square" shown in FIG. 5 as an example, 4 vertices of the large square and 4 vertices of the small square are used as the first change element, and the vertices of the large square and the small square do not coincide. In this case, the mass center is considered as the third change element. When the required number of coded data points is 2, the user can choose to use one vertex in each of the large square and the small square to code the data points as shown in FIG. 6, and then there are 9×8/(1×2)=36 kinds of changes according to the arrangement and combination.

The screen coding system based on mass center coincidence further includes: an image correction module 3, configured to configure a positioning recognition unit different from the coding unit, configure a boundary unit used to determine an image boundary, and correct an image including the positioning recognition unit and the boundary unit through a perspective change.

The method specifically includes: configuring a positioning recognition unit different from the coding unit, and the difference may be embodied in the use of a specific coding unit model combination of geometric graphics different from other coding units. For example, the positioning recognition unit uses a combination of the equilateral triangle and the square as shown in FIG. 2, while other coding units use a combination of the large square and the small square as shown in FIG. 3. In addition, in other implementations, the difference may also be embodied in that the number of coded data points of the positioning recognition unit is different from the number of coded data points of other coding units. For example, a combination of a large square, a small square and mass center points is used, as shown in FIG. 7, the positioning recognition unit uses 5 data points; and as shown in FIG. 6, other coding units use 2 data points. The number of data points of the positioning recognition unit used for positioning recognition is different from the number of coded data points of the coding unit. As shown in FIG. 7, in the solution of using a mass center, 2 points of a small square, and 2 points of a large square, a total of 5 points are provided. Then when positioning recognition is performed, the mass center point is found first, then the 2 points of the small square are located, and the 2 points of the large square are located.

When image correction is performed, it is also necessary to configure a boundary unit used to determine an image boundary. The boundary unit is composed of a mass center point and a non-mass center point. As shown in FIG. 9, the four coding units circled are boundary units. Exemplarily, when a camera is used to collect images, the collected images are usually deformed. FIG. 8 shows a specific effect photographed by a camera, and FIG. 9 shows a normal image effect. Herein, the image is corrected through perspective changes. According to the theory of perspective changes, 4 coded data points are needed. As shown in FIG. 8 and FIG. 9, in an image composed of 3×3=9 coding units, 4 coding units framed by thick lines are boundary units. The centers (mass center points) of the 4 boundary units are 4 points of the perspective changes, and the 4 points that affect the image need to be corrected. Similarly, the 4 boundary units framed by the thick lines in FIG. 10 and FIG. 11 are points found to affect the normal display of the image when the above principle is used for image correction, and then the overall image is corrected by correcting such points.

In the system according to the embodiment of the present disclosure, through a coding scheme with a controllable data length of a coding unit, when more data needs to be coded, the overall size of the coding unit does not need to be changed, which greatly improves coding efficiency, and adapts to a data coding scheme of a plurality of different coding units. Moreover, the solution is based on coding unit models composed of a plurality of polygons with coincident mass centers, which is simple and easy to implement, and a plurality of different coding unit models that are conducive to data coding are provided, which is conducive to the application of a plurality of coding forms. In addition, an image using this coding method can also be used for image correction processing.

Embodiment 3

Figure 13:
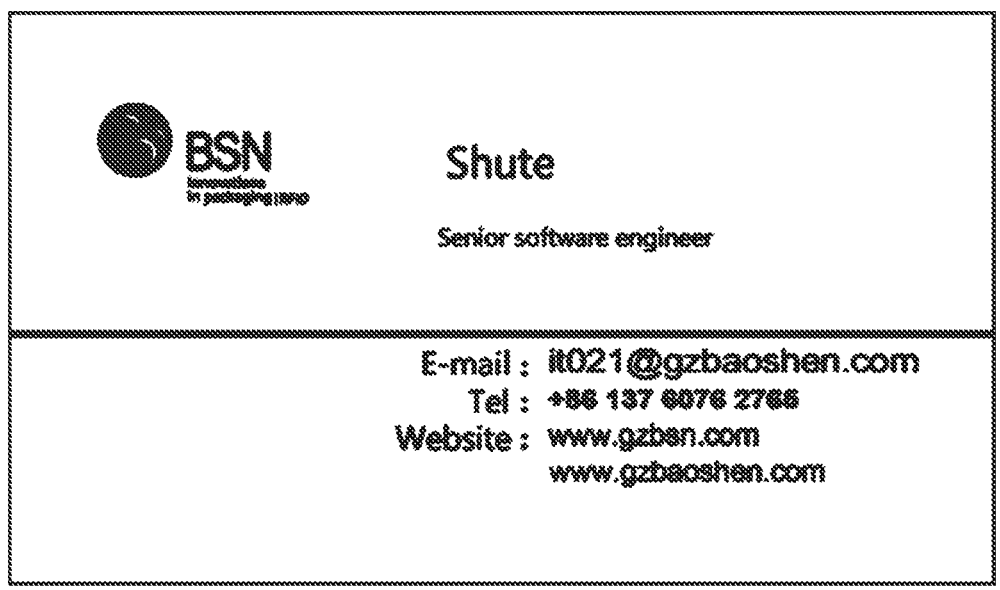
FIG. 13 is a schematic diagram of an identity card using a screen coding method based on mass center coincidence according to an embodiment of the present disclosure.

Referring now to FIGS. 13-15, schematic diagrams of an identity card using a screen coding method based on mass center coincidence according to an embodiment of the present disclosure are depicted. As shown in FIG. 13, the identity card includes a card body and a coded pattern printed on a surface of the card body and generated by using the above-mentioned screen coding method based on mass center coincidence. The identity card may include an employee card, an access card, or the like. An additional layer of code generated by using the above-mentioned method is superimposed on an ordinary employee card shown in FIG. 13. As shown in FIG. 14, the card may also be as shown in FIG. 15, a coded pattern is designed to be very small, such as 2 mm×2 mm Provided that the entire card is covered with a plurality of codes with the same content, when scanning recognition is performed, a complete effective coding area that is not destroyed by text and graphics on the card can be found, so as to identify a personal identity.

Further, in other implementations, an apparatus for identifying personal information is also disclosed. The apparatus includes the above-mentioned identity card and a device that can identify a coded pattern on the card. The device is provided with a program for identifying the coded pattern. The identity of a card owner can be identified when the scanning is successful. In this way, the cost can be effectively reduced, and the effect equivalent to that of an electronic access control card can be achieved only through the printed coded pattern.

Further, in other implementations, the coded pattern may further be used for commodities, with a function similar to that of a commodity number, which is used to identify a type of a commodity. Furthermore, each commodity may be assigned a different number (one item one code), so that each commodity can be identified, which can be used for source tracing and anti-counterfeiting. Specifically, tags and labels of commodities may be covered with a plurality of above-mentioned coded patterns with the same content, and the commodities can be identified by using a special device and program.

Further, in other implementations, the coded pattern may further be used for reading for the blind and teaching for children. For example, a layer of above-mentioned coded patterns are superimposed on a conventional text reading. The device that can identify the coded pattern and make a sound can make a sound and read out the text content after scanning the coded patterns on the reading.

Embodiment 4

Figure 16:
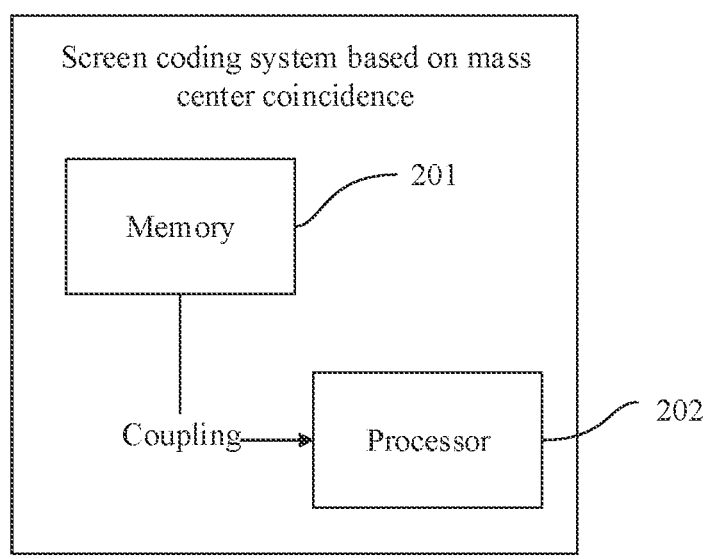
FIG. 16 is a schematic structural diagram of an interactive apparatus of screen coding based on mass center coincidence according to an embodiment of the present disclosure.

Referring to FIG. 16, a schematic structural diagram of a screen coding apparatus based on mass center coincidence according to an embodiment of the present disclosure is depicted. The apparatus described in FIG. 16 can be applied to a system, and in the embodiments of present disclosure, no restriction is imposed on the application system of screen coding based on mass center coincidence. As shown in FIG. 16, the apparatus may include: a memory 201 storing executable program codes; and a processor 202 coupled with the memory 201; where the processor 202 invokes the executable program codes stored in the memory 201 to execute the coded pattern identification and analytic program generated through the screen coding method based on mass center coincidence described in Embodiment 1. An identification apparatus may refer to a system operable to identify the code, and such a system may include memory and algorithms that can identify the code, along with a camera, processor, and memory. These elements may be incorporated into a handheld apparatus such as a smart phone or other device.

In some embodiments, the processor 202 may be any processing device now known or later developed, and may include any processing component configured to receive and execute instructions (such as from a data storage component and/or the memory 201). The memory 201, such as a non-transitory, processor-readable storage medium, may be configured as a volatile and/or a nonvolatile computer-readable medium and, as such, may include random access memory (including SRAM, DRAM, and/or other types of random access memory), flash memory, registers, compact discs (CD), digital versatile discs (DVD), and/or other types of storage components. As such, the memory 201 may be referred to as a non-transitory, processor-readable storage medium. Additionally, the memory 201 may be configured to store various processing logic, such as, for example, various logic modules for carrying out the processes described herein (each of which may be embodied as a computer program, firmware, or hardware, as an example). Illustrative modules include, but are not limited to, a coding unit model generation module and/or a coding unit generation module described herein. Other components of computing systems that may be used to execute the processes described herein should generally be understood and are not discussed in greater detail herein solely for the purposes of brevity.

Embodiment 5

This embodiment of the present disclosure discloses a computer-readable storage medium that stores a computer program for electronic data exchange, where the computer program causes a computer to perform the screen coding method based on mass center coincidence described in Embodiment 1. In some aspects, the computer-readable storage medium may be the memory 201 described herein above with respect to FIG. 16.

Embodiment 6

This embodiment of the present disclosure discloses a computer program product. The computer program product includes a non-transitory computer-readable storage medium storing a computer program, and the computer program is operable to cause a computer to perform the screen coding method based on mass center coincidence described in Embodiment 1 or Embodiment 2. In some aspects, the computer-readable storage medium may be the memory 201 described herein above with respect to FIG. 16.

The embodiments described above are merely illustrative, where modules described as separate components may or may not be physically separated. Components displayed as modules may or may not be physical modules, that is, the components may be located in one place, or may be distributed to a plurality of network modules. Some or all of the modules may be selected according to actual needs to achieve the objective of the solution of the embodiment. Those of ordinary skill in the art can understand and implement the embodiment without creative labor.

Through the specific description of the foregoing embodiments, those skilled in the art can clearly understand that each embodiment may be implemented by means of software plus a necessary universal hardware platform, or certainly, may be implemented through hardware. Based on this understanding, the above technical solution essentially or the part that contributes to the prior art can be embodied in the form of a software product. The computer software product can be stored in a computer-readable storage medium, and the storage medium includes a read-only memory (ROM), a random access memory (RAM), a programmable read-only memory (PROM), an erasable programmable read-only memory (EPROM), a one-time programmable read-only memory (OTPROM), an electronically-erasable programmable read-only memory (EEPROM), a compact disc read-only memory (CD-ROM) or other optical disk memories, magnetic disk memories, magnetic tape memories, or any other computer-readable medium that can be used to include or store data (e.g., the memory 201 described herein above with respect to FIG. 16).

Finally, it should be noted that the screen coding method and apparatus based on mass center coincidence disclosed according to embodiments of the present disclosure disclose only certain embodiments of the present disclosure, and are only used to explain the technical solutions of the present disclosure, and are not intended to limit the same. Although the present disclosure is described in detail with reference to the foregoing embodiments, those of ordinary skill in the art should understand that they can still modify the technical solutions described in the foregoing embodiments, or make equivalent replacements on some technical features therein. These modifications or replacements do not make the essence of the corresponding technical solutions deviate from the spirit and scope of the technical solutions of the embodiments of the present disclosure.

What is claimed is:

1. A screen coding method based on mass center coincidence, comprising:
    constructing a plurality of coding unit models comprising a combination of a plurality of geometric figures with coincident mass centers, wherein vertices of the geometric figures do not coincide; and
    filling in data information to each vertex of the coding unit models according to a method of data information arrangement of a plurality of data combinations to generate a coding unit so as to implement different data lengths of the same coding unit; wherein:

during the constructing, the coding unit models are each implemented as a combination of two equilateral polygons with coincident mass centers, and the method of data information arrangement of the plurality of data combinations comprises:

using vertices of the two equilateral polygons as a first change element;

using the number of coded data points as a second change element; and performing arrangement and combination according to the first change element and the second change element to determine the method of data information arrangement.

2. The screen coding method based on mass center coincidence according to claim 1, wherein the method of data information arrangement of the plurality of data combinations further comprises:

using mass centers of the two equilateral polygons as a third change element; and performing arrangement and combination according to the first change element, the second change element, and the third change element to determine the method of data information arrangement.

3. The screen coding method based on mass center coincidence according to claim 1, further comprising:

configuring a positioning recognition unit different from the coding unit;

configuring a boundary unit used to determine an image boundary; and correcting a digital image comprising the positioning recognition unit and the boundary unit through a perspective change.

4. The screen coding method based on mass center coincidence according to claim 3, wherein the configuring the positioning recognition unit different from the coding unit comprises:

configuring a coding unit model of the positioning recognition unit to adopt a combination of geometric figures different from those of other coding units.

5. The screen coding method based on mass center coincidence according to claim 4, wherein the configuring the positioning recognition unit different from the coding unit comprises:

configuring the number of coded data points of the positioning recognition unit to be different from the number of coded data points of the coding unit.

6. A screen coding system based on mass center coincidence, comprising:

a coding unit model generation module, configured to construct a plurality of coding unit models composed of a combination of a plurality of geometric figures with coincident mass centers, wherein vertices of the geometric figures do not coincide; and a coding unit generation module, configured to fill in data information to each vertex of the coding unit models according to a method of data information arrangement of a plurality of data combinations to generate a coding unit so as to implement different data lengths of the same coding unit; wherein in the coding unit model generation module, the coding unit models are each implemented as a combination of two equilateral polygons with coincident mass centers and the method of data information arrangement of a plurality of data combinations of the coding unit generation module is implemented as:

using vertices of the two equilateral polygons as a first change element;

using the number of coded data points as a second change element; and performing arrangement and combination according to the first change element and the second change element to determine a method of data information arrangement.

7. The screen coding system based on mass center coincidence according to claim 6, wherein the method of data information arrangement of a plurality of data combinations of the coding unit generation module is implemented as:

using mass centers of the two equilateral polygons as a third change element; and performing arrangement and combination according to the first change element, the second change element, and the third change element to determine a method of data information arrangement.

8. The screen coding system based on mass center coincidence according to claim 6, further comprising:

an image correction module, configured to configure a positioning recognition unit different from the coding unit and a boundary unit used to determine an image boundary, and correct an image comprising the positioning recognition unit and the boundary unit through a perspective change.

* * * * *